United States Patent [19]

Merkel

[11] Patent Number: 4,952,535
[45] Date of Patent: Aug. 28, 1990

[54] ALUMINUM NITRIDE BODIES AND METHOD

[75] Inventor: Gregory A. Merkel, Painted Post, N.Y.

[73] Assignee: Corning Incorporated, Corning, N.Y.

[21] Appl. No.: 381,848

[22] Filed: Jul. 19, 1989

[51] Int. Cl.⁵ .............................................. C04B 35/00
[52] U.S. Cl. ...................................... 501/96; 501/98; 501/151
[58] Field of Search ................... 501/96, 98, 151, 152, 501/153; 264/66

[56] References Cited

U.S. PATENT DOCUMENTS 4,698,320  10/1987  Kasori et al. ........................ 501/96
4,711,861  12/1987  Sawamura et al. .................. 501/98

Primary Examiner—Jr. Dixon
Assistant Examiner—Chris Gallo
Attorney, Agent, or Firm—Clinton S. Janes; Milton M. Peterson

[57] ABSTRACT

There is disclosed a highly densified, sintered aluminum nitride body having a thermal conductivity in excess of 200 W/m°K. and a strong resistance to attack by hot HCl. There is also disclosed a method of sintering aluminum nitride bodies which employs a variable thermal cycle whereby the body is either heated slowly through a pre-sintering temperature range of 1300° to 1750° C., or held at a temperature within that range for at least a half hour. Optionally, a green aluminum nitride body may be provided with up to 10% by weight of at least one metal fluoride dopant, and may be provided with a sufficient weight to maintain flatness during firing.

53 Claims, 4 Drawing Sheets

ALUMINUM NITRIDE BODIES AND METHOD

FIELD OF THE INVENTION

The invention relates to sintered ceramic bodies composed primarily of aluminum nitride, and to methods for their fabrication.

BACKGROUND OF THE INVENTION

Aluminum nitride ceramic bodies have recently received considerable attention, particularly as substrates for integrated circuit packages Such bodies have a high electrical resistivity (at least $10^{11}$ ohm cm), a dielectric constant on the order of 8–10 and a low coefficient of thermal expansion that closely matches silicon. Of particular interest, however, is the potentially high thermal conductivity of an aluminum nitride body. This characteristic permits ready dissipation of heat, generated either during fabrication of an integrated circuit or during subsequent operation, thereby avoiding thermal degrading of electrical properties.

Theoretically, fully densified, pure aluminum nitride has a thermal conductivity of about 320 W/m°K. However, actual values in the range of 30–60 W/m°K were obtained with either sintered or hot pressed bodies of undoped aluminum nitride.

PURPOSES OF THE INVENTION

A basic purpose is to provide an improved aluminum nitride substrate for use in integrated circuit packaging.

Another purpose is to provide fluoride dopants for a green aluminum nitride body that impart unexpectedly superior properties in the sintered body.

A further purpose is to provide a sintered aluminum nitride body having an actual thermal conductivity above 170 W/m°K.

Another purpose is to provide a unique sintering cycle for an aluminum nitride body that enhances properties of the body.

A further purpose is to provide a sintered aluminum nitride body in which warping is minimized.

A still further purpose is to provide a sintered aluminum nitride body having good acid durability.

SUMMARY OF THE INVENTION

The article of the invention resides in a sintered, aluminum nitride body having an oxygen content below 0.2% by weight, and a thermal conductivity in excess of 170 W/m°K. A preferred embodiment has a weight loss of not over about one mg/cm² when exposed to hot 5% HCl for six hours.

The inventive method of sintering an aluminum nitride body comprises firing the body in a non-oxidizing environment, such as a vacuum or nitrogen gas, in accordance with a variable thermal cycle, the thermal cycle including heating to about 1300° C., raising the temperature from 1300° C. to 1750° C. in at least one hour, but not over five hours, further raising the temperature to 1800° C. in a non-oxidizing atmosphere, such as nitrogen gas, and maintaining the body in such atmosphere within the temperature range of 1800°–2000° C. for at least one hour, but not over 24 hours, and cooling. The body is preferably sintered with light weights applied to prevent warping. The weights preferably are composed of a nitride, a carbide, or a boride, or of another material having a facing, or barrier layer, of said nitride, carbide, or boride.

A particularly preferred method of the invention comprises mixing about 90–99 parts by weight (pbw) aluminum nitride powder, containing oxygen as an impurity, with 10-1 pbw of a fluoride powder additive selected from the group consisting of yttrium fluoride ($YF_3$) alone, a mixture of yttrium fluoride and an alkaline earth metal fluoride ($RF_2$), preferably $CaF_2$ or $SrF_2$, wherein the ratio of $YF_3$ to $RF_2$ is at least 1:50, and a mixture of a rare earth metal fluoride ($MF_3$), other than $YF_3$ and preferably $LaF_3$, with an alkaline earth metal fluoride wherein the ratio of $MF_3$ to $RF_2$ is not over about 1:1, forming a body of desired shape from the mixture, firing the body in a non-oxidizing environment in accordance with a variable thermal cycle, the thermal cycle including heating to about 1300° C., raising the temperature from 1300° C. to 1750° C. in at least one hour, but not over five hours, further raising the temperature to 1800° C. in a non-oxidizing atmosphere, and maintaining the body in such atmosphere within the temperature range of 1800°–2000° C. for at least one hour but not over 24 hours, and cooling.

PRIOR PATENT LITERATURE

U.S. Pat. No. 4,340,436 (Dubetsky et al.) discloses forming a sintered glass-ceramic substrate with internal, copper conductor patterns by superimposing green sheets, at least one of which has conductors applied, firing the stack to an intermediate temperature, applying a light-weight alumina tile and completing the firing to coalesce and crystallize the glass particles in the green sheets. No effect of tile composition is noted. U.S. Pat. No. 4,719,187 (Bardhan et al.) discloses doping nitride-based ceramics with selected metal fluorides to lower the sintering temperature. The materials are sintered in a nitrogen atmosphere. Thermal conductivities in the range of 120 to 140 W/m°K were observed on bodies fired at 1900° C. U.S. Pat. No. 4,698,320 (Kasori et al.) discloses adding 0.01 to 20% of a selected fluoride to aluminum nitride as a sintering aid and to improve thermal conductivity. The material is sintered at 1600°–1850° C. in a nitrogen atmosphere, and thermal conductivities of 60–80 W/m°K are reported.

U.S. Pat. No. 4,746,637 (Kasori) discloses adding 0.01 to 20% of a rare earth metal oxide, or fluoride, plus an alkaline earth metal oxide, or fluoride, to aluminum nitride to aid sintering and improve density and thermal conductivity in the sintered body. The material is sintered at 1600°–1800° C. in nitrogen, and thermal conductivities of about 80–130 W/m°K are reported.

U.S. Pat. No. 4,810,679 (Dole et al.) discloses the addition of 0.5 to 20 wt % of a rare earth metal fluoride to aluminum nitride to improve density and thermal conductivity. The material is sintered at 1800°–1900° C. in a nitrogen-containing atmosphere, and thermal conductivities of 60 to 150 W/m°K are reported.

U.S. Pat. No. 4,711,861 (Sawamura et al.) discloses a sintered, aluminum nitride body produced by adding to aluminum nitride powder at least one sintering aid selected from the borides, carbides, nitrides and fluorides of calcium, strontium, barium and rare earth metals and mixtures thereof, in an amount of 0.01 to 10% by weight of the aluminum nitride, and sintering in a non-oxidizing atmosphere. Thermal conductivities varying from 60 to 140 W/m°K are disclosed No one of the patents makes reference to providing a dwell time during a pre-sintering temperature interval, or to the viability of utilizing a vacuum environment between 1300° and 1750° C.

BRIEF DESCRIPTION OF THE DRAWING

In the accompanying drawing.

GENERAL DESCRIPTION OF THE INVENTION

My invention is based on a series of interrelated discoveries made with respect to sintered, aluminum nitride bodies, and the manner in which they are sintered. These discoveries, taken together, have enabled me to produce sintered, aluminum nitride bodies that approach full density, that have thermal conductivities in excess of 200 W/m°K, and that have a strong resistance to attack by hot hydrochloric acid.

Figure 1:
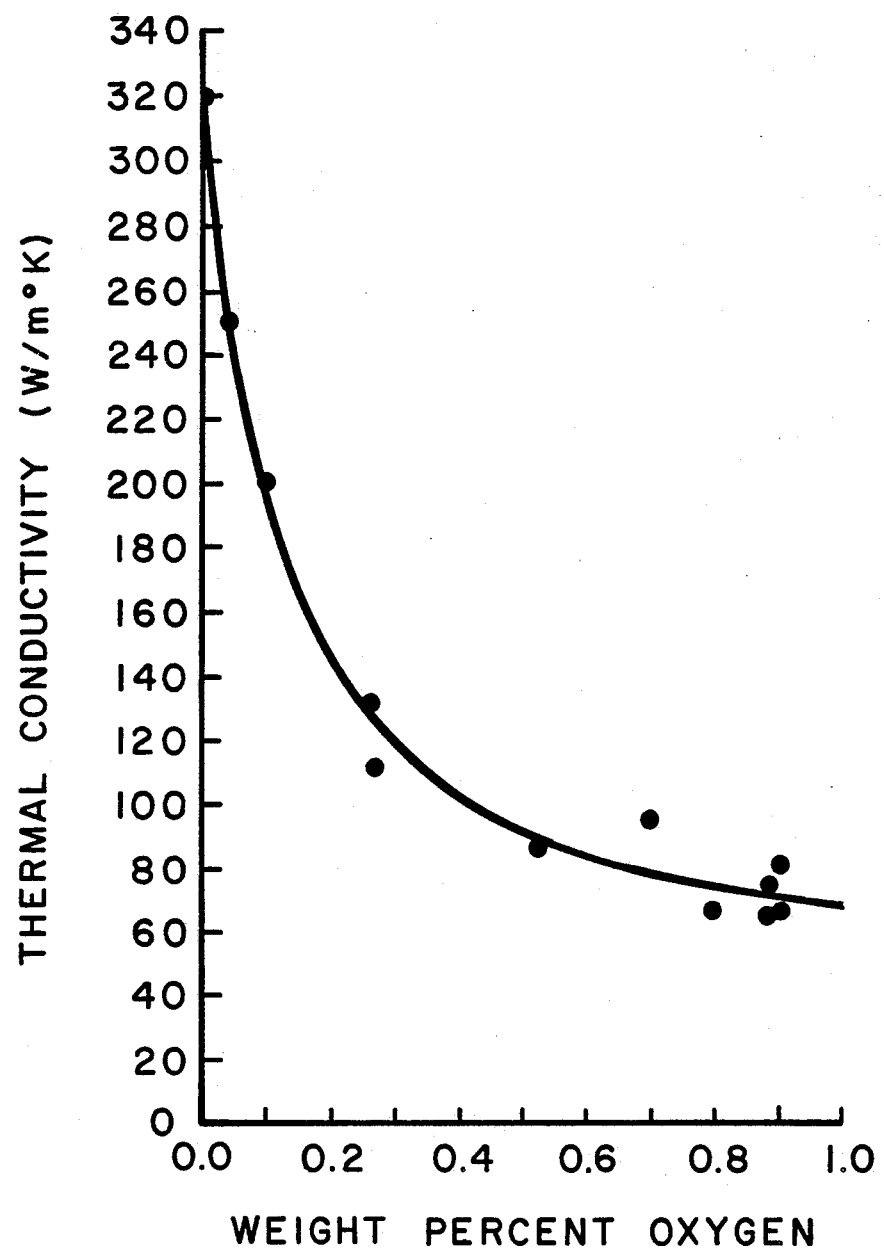
FIG. 1 is a graphical illustration of the relationship between oxygen content and thermal conductivity in sintered, aluminum nitride bodies.

FIG. 1 of the drawing illustrates the general relationship found to exist in AlN, sintered bodies between thermal conductivity ($\gamma$) and oxygen (O) content. The former is plotted along the vertical axis in watts per meter per Kelvin temperature (W/m°K); the latter in percent by weight along the horizontal axis. Sintered bodies prepared in accordance with the invention have oxygen contents generally below 0.2%, and consequent $\gamma$ values over 170, and preferably over 200, W/m°K.

One discovery concerns the effect of the environment during the sintering cycle of an aluminum nitride body. The art has recognized that a sintered, aluminum nitride body may still contain up to 4% oxygen even though the sintering cycle is carried out in a nitrogen atmosphere. The Bardhan et al. patent, noted earlier, explains that about 2.1% alumina saturates the aluminum nitride, and that additional oxygen occurs in other phases. The patent further explains how the consequent lattice vacancies, substitutions and other dislocations drastically reduce the potential thermal conductivity of pure aluminum nitride.

Heretofore, it has been customary to employ a nitrogen atmosphere throughout the firing cycle. Thus, following an initial burnout of organic vehicle in air, a nitrogen atmosphere was introduced and maintained until the sintered body was cooled. However, I am unaware that variation or control of the thermal cycle has been seriously studied. Rather, normal practice has been a rapid, continuous firing cycle at essentially constant rate.

I have now found that the thermal conductivity of a sintered, aluminum nitride body is much improved if the body is heated slowly through a pre-sintering temperature range of 1300° to 1750° C.. The body should be held within that range at least an hour, and preferably one to two hours. The body may be heated at a slow rate through the range, the total lapsed time being at least one hour. However, preferred practice is to heat rapidly to a selected temperature, e.g. 1700° C., and then hold at that temperature for a period of time, e.g. an hour.

The body may then be heated to a sintering temperature in the range of 1800°–2000° C., preferably 1900° C. It is then maintained at such temperature, or within the range, for up to 24 hours, preferably at least one to four hours.

Figure 2:
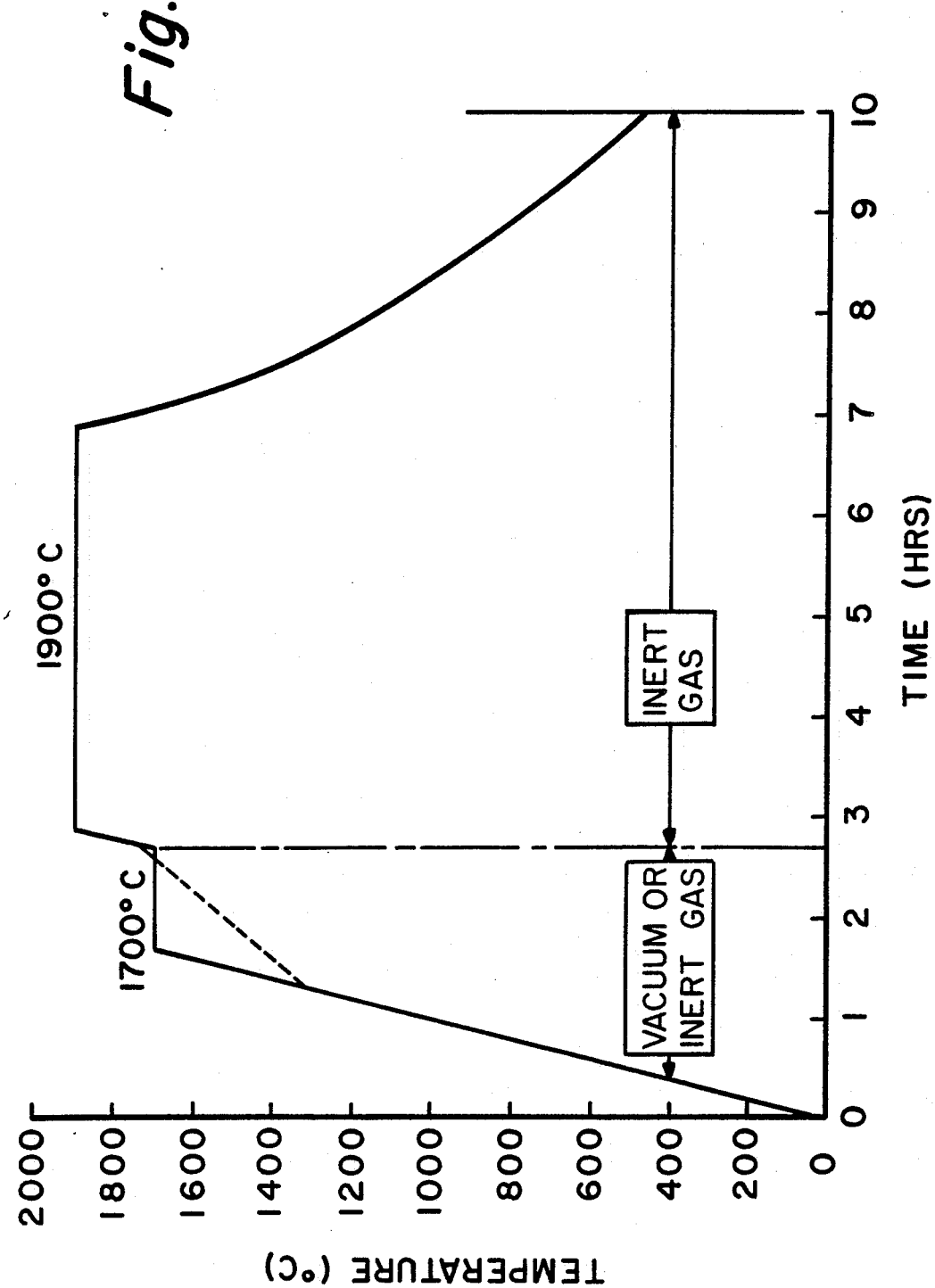
FIG. 2 is a graphical illustration of two alternative thermal cycles in accordance with the invention.

FIG. 2 illustrates graphically a preferred thermal cycle. Thus, the body may be heated at furnace rate, typically 1000° C./hour, up to 1300° C. This rate may be continued to 1700° C., and the temperature then held essentially constant for an hour. The normal rate of increase is then resumed up to a temperature in the range of 1800°–2000° C., e.g. 1900° C., where the temperature is again held for four hours. The respective hold times may be longer, e.g. up to two hours at 1700° C. and up to 24 hours at 1900° C. While such longer times may impart some further improvement, it is generally minor.

In FIG. 2, the hold times are indicated by horizontal lines at 1700° C. and at 1900° C. As an alternative to the hold time at 1700° C., or elsewhere in the 1300°–1750° C. range, a slow continuous temperature increase through that range may be employed. This is indicated by a dashed line. Thus, the normal half-hour heating time, plus the one-hour hold, means the body is in the 1300°–1750° C. range for about 1-1/2 hours. A similar beneficial effect may be obtained by heating at a slower rate, e.g. 5°/min , through the temperature range so that the total time lapse is the same.

It is not known why the properties of a sintered, AlN body, particularly the thermal conductivity, are so sensitive to time within the pre-sintering temperature range of 1300°–1750° C. It may be that chemical reactions resulting in volatile products occur in that range and require time for completion. It may also be that structural rearrangements, such as grain growth and elimination of grain boundaries, occur. It has been observed that samples with high thermal conductivities, sintered in this manner, also tend to exhibit high translucency.

The body must be fired in a non-oxidizing environment. During the pre-sintering portion of the thermal cycle, that is the temperature interval up to 1750° C., this may be a vacuum, or it may be a non-oxidizing atmosphere, such as nitrogen alone or in mixture with hydrogen or argon. In some instances, at least, it has been found desirable to heat in an atmosphere to 1300° C. Then, a vacuum is drawn during the pre-sintering portion of the thermal cycle, that is, between 1300° and 1750° C., or at least during a temperature hold. It is necessary, however to return to a gaseous atmosphere, preferably nitrogen, during the final sintering. Otherwise, the body tends to become porous.

It has been observed that unfired, green, aluminum nitride bodies tend to warp rather seriously when fired. This necessitates considerable machining to provide a smooth, flat body for use as a substrate. The problem is less severe for thick bodies. It is particularly severe, however, for tape cast strips where a 2 mm thickness or less may be required in the fired body.

I have found that this warping problem can be avoided in large degree by applying light weights, such as flat plates, on the green body before starting the sintering cycle. However, when either metal or graphite flat plates were used with fluoride-doped bodies, as disclosed in the Bardhan et al. patent, thermal conductivity was seriously impaired, that is, was markedly lower than expected Study revealed that this could be avoided by using flat plates composed of refractory nitrides, carbides or borides. Preferred materials include titanium, boron and aluminum nitrides, titanium carbide and titanium boride. Further study showed that other materials could be used for the weight, if they were provided with a nitride, carbide or boride facing. Alternatively, a thin barrier layer or sheet of such refractory material might be inserted between the applied weight and the body being fired.

My invention is further predicated on a discovery relative to the doping of green, aluminum nitride bodies preparatory to sintering. The effect of incorporating selected metal fluorides as sintering aids is described in the earlier mentioned Bardhan et al. patent wherein thermal conductivities as high as 130 W/m°K are reported. Kasori et al. U.S. Pat. No. 4,746,637 describes using mixtures of oxides or fluorides as dopants to improve thermal conductivity, but also reports values no greater than about 130 W/m°K.

I have now found that the thermal conductivities of a fluoride-doped aluminum nitride body may be enhanced by sintering the body using a modified thermal cycle in accordance with this invention. However, especially high values are obtained by employing additions of yttrium fluoride ($YF_3$) alone, or in conjunction with an alkaline earth metal fluoride ($RF_2$), such as calcium fluoride ($CaF_2$), or strontium fluoride ($SrF_2$). The fluoride additive may be useful in amounts from one to ten percent of the mixture with aluminum nitride. However, optimum results appear to be obtained with about 5%. The additive preferably is yttrium fluoride alone, or a $YF_3$-$RF_2$ mixture wherein the ratio of $YF_3$ to $RF_2$ is at least 1:50. Alternatively, a mixture of a rare earth metal fluoride ($MF_3$) other than yttrium, such as lanthanum or cerium, with an alkaline earth metal fluoride ($RF_2$) may be usefully employed providing the ratio of $MF_3$ to $RF_2$ is not over about 1:1.

The amount of fluoride dopant added depends in part on the weight of the metal in the fluoride. Where an excess of additive is not employed, the amount retained in the final sintered body may be extremely small, since volatilization is assumed to occur. Thus, the composition of the sintered body cannot be defined in terms of the starting materials.

DESCRIPTION OF SPECIFIC EMBODIMENTS OF THE INVENTION

Batches of AlN powder, with additions of metal fluoride powder as a sintering aid, were vibratory milled for 96 hours in 1,1,1-trichloroethane. The batch was dried overnight in a dish at about 60° C. After granulating through a 20-mesh screen, the powder was weighed into a steel die and pressed into 1.25-inch (3.2 cm.) diameter discs approximately 0.2 inches (0.5 cm.) thick. The compacted powder discs were subsequently cold isostatically pressed at 40,000 psi (2812 kg/cm$^2$) to a green density of approximately 56 to 62% of theoretical.

Alternatively, the powder was redispersed in an organic system consisting of a polyvinyl butyral binder plus plasticizer and dispersant in a toluene-based solvent. The slurry was ball-milled on rollers and cast into 9-mil (0.23 mm) thick sheets. Sheets were then cut into 1.5-inch (3.8 cm.) squares, laminated together at 2000 psi (140 kg/cm$^2$) and 75°-85° C., and trimmed to form 1.25-inch (3.2 cm.) square substrates with a thickness of 50 to 200 mils. (1.3 to 5.2 mm).

The surface area value of the AlN powder increased from about 3.7 square meters per gram to at least 6.0 as the processing progressed. Likewise, oxygen content increased from 1.76 weight percent to about 2.8 percent.

The discs or square substrates were heated to 550° C., and held at that temperature in air for five hours to remove any organic constituents. The samples were subsequently transferred to a graphite setter pallet having two 7-mil (0.18 mm) sheets of tape-cast boron nitride (BN) as a barrier layer. Two more BN sheets were then placed over the samples. A ½-inch (1.3 cm.) thick disc or ¾-inch (1.9 cm.) thick plate of graphite was placed on top of the samples plus sheets to provide sufficient pressure to maintain sample flatness during sintering. In the case of the "unconfined" samples, the upper BN sheets and graphite plate were not utilized. The graphite pallet and sample were then covered with an inverted-crucible or box type of graphite lid. The entire assembly was placed on the graphite hearth in a graphite resistance vacuum furnace.

The loaded furnace was evacuated to 50-150 microns Hg with a mechanical pump before heating was initiated. Temperatures were monitored and controlled with either a tantalum-sheathed W-5Re/W-26Re thermocouple (25°-1700° C.) or an infrared pyrometer (260°-2200° C.) Before starting the heating cycle, the furnace was isolated from the pump and backfilled with dry nitrogen which was subsequently flowed through the furnace at about 2 to 20 SCFH. Alternatively, in some experiments, the vacuum environment was maintained to a maximum temperature of 1750° C., and the furnace isolated from the pump and backfilled with flowing nitrogen before proceeding to higher temperatures.

In order to explore the various ramifications of the invention, and the effects thereby achieved, numerous different batch mixtures were prepared and fired under different conditions. Thus, batches were prepared in which AlN, in amounts of 2%, 5% and 8%, was replaced by $CaF_2$, $SrF_2$, $YF_3$, mixtures of $CaF_2$ and $YF_3$, and mixtures of $SrF_2$ and $YF_3$. Also, batches employing mixtures of $CaF_2$ or $SrF_2$ with lanthanide fluorides were prepared and fired. Bodies pressed from these batches were then sintered by heating to 1900° C. in accordance with three different thermal cycles:

1. Maintain a nitrogen atmosphere, except for a one-hour soak under vacuum at 1700° C.
2. Maintain a nitrogen atmosphere throughout with a one-hour soak at 1700° C.
3. Maintain a nitrogen atmosphere with no soak at 1700° C. (comparative examples).

In addition, identical samples were fired under identical conditions, except that one set was provided with an overlying graphite disc or plate, and a second was left unconfined.

TABLES 1 and 2 identify the test pieces by "Sample No." and "Run No.". The odd numbered samples were sintered without an overlying graphite plate, while the even numbered were sintered under a plate. Run 1 had a vacuum soak at 1700° C.; Run 2 had a $N_2$ soak at 1700° C.; Run 3 had no soak. The amounts of $CaF_2$, or $SrF_2$, and $YF_3$ or $LaF_3$ in each test piece before sintering is shown in weight percent; density (D) in grams per cm$^3$ (g/cm$^3$); thermal conductivity ($\gamma$) in watts per meter per degree Kelvin (W/m°K)

The results shown in TABLE 1 are for a metal fluoride addition of 5%. Data obtained with 2% and 8% levels were similar, but generally somewhat lower. This indicates an optimum in the neighborhood of 5%. It is also apparent that either $YF_3$ alone, or a mixture of $YF_3$ and $CaF_2$ or $SrF_2$, provides higher thermal conductivities than $CaF_2$ or $SrF_2$ alone. Also, in TABLE 2, a mixture of $LaF_3$ and $CaF_2$ provides higher $\gamma$ than either $CaF_2$ or $LaF_3$ alone.

TABLE 1

| Sample No. | Wt % AlN | Wt % CaF2 | Wt % YF3 | Run No. | D(g/cm³) | γ |
|---|---|---|---|---|---|---|
| 1 | 95 | 5.0 | 0.0 | 1 | 3.082 | 152 |
| 2 | 95 | 5.0 | 0.0 | 1 | 3.142 | 184 |
| 3 | 95 | 5.0 | 0.0 | 2 | 2.724 | 163 |
| 4 | 95 | 5.0 | 0.0 | 2 | 2.667 | 183 |
| 5 | 95 | 5.0 | 0.0 | 3 | 2.664 | 124 |
| 6 | 95 | 5.0 | 0.0 | 3 | 2.645 | 111 |
| 1 | 95 | 4.0 | 1.0 | 1 | 3.232 | 260 |
| 2 | 95 | 4.0 | 1.0 | 1 | 3.233 | 258 |
| 3 | 95 | 4.0 | 1.0 | 2 | 2.910 | 167 |
| 4 | 95 | 4.0 | 1.0 | 2 | 2.854 | 165 |
| 5 | 95 | 4.0 | 1.0 | 3 | 2.893 | 159 |
| 6 | 95 | 4.0 | 1.0 | 3 | 2.874 | 155 |
| 1 | 95 | 2.5 | 2.5 | 1 | 3.229 | 216 |
| 2 | 95 | 2.5 | 2.5 | 1 | 3.249 | 242 |
| 3 | 95 | 2.5 | 2.5 | 2 | 2.975 | 204 |
| 4 | 95 | 2.5 | 2.5 | 2 | 2.873 | 179 |
| 5 | 95 | 2.5 | 2.5 | 3 | 2.965 | 164 |
| 6 | 95 | 2.5 | 2.5 | 3 | 3.039 | 179 |
| 1 | 95 | 1.0 | 4.0 | 1 | 3.204 | 232 |
| 2 | 95 | 1.0 | 4.0 | 1 | 3.237 | 231 |
| 3 | 95 | 1.0 | 4.0 | 2 | 3.241 | 242 |
| 4 | 95 | 1.0 | 4.0 | 2 | 3.231 | 233 |
| 5 | 95 | 1.0 | 4.0 | 3 | 3.175 | 177 |
| 6 | 95 | 1.0 | 4.0 | 3 | 3.143 | 185 |
| 1 | 95 | 0.0 | 5.0 | 1 | 3.252 | 251 |
| 2 | 95 | 0.0 | 5.0 | 1 | 3.149 | 218 |
| 3 | 95 | 0.0 | 5.0 | 2 | 3.245 | 261 |
| 4 | 95 | 0.0 | 5.0 | 2 | 3.249 | 259 |
| 5 | 95 | 0.0 | 5.0 | 3 | 3.257 | 191 |
| 6 | 95 | 0.0 | 5.0 | 3 | 3.231 | 180 |
| 1 | 95 | 5.0 | 0.0 | 1 | 2.755 | 129 |
| 2 | 95 | 5.0 | 0.0 | 1 | 2.937 | 140 |
| 3 | 95 | 5.0 | 0.0 | 2 | 2.878 | 169 |
| 4 | 95 | 5.0 | 0.0 | 2 | 2.823 | 155 |
| 5 | 95 | 5.0 | 0.0 | 3 | 2.862 | 147 |
| 6 | 95 | 5.0 | 0.0 | 3 | 2.788 | 148 |
| 1 | 95 | 4.0 | 1.0 | 1 | 3.082 | 207 |
| 2 | 95 | 4.0 | 1.0 | 1 | 3.052 | 194 |
| 3 | 95 | 4.0 | 1.0 | 2 | 2.961 | 186 |
| 4 | 95 | 4.0 | 1.0 | 2 | 2.965 | 193 |
| 5 | 95 | 4.0 | 1.0 | 3 | 3.065 | 183 |
| 6 | 95 | 4.0 | 1.0 | 3 | 2.892 | 160 |
| 1 | 95 | 2.5 | 2.5 | 1 | 3.241 | 220 |
| 2 | 95 | 2.5 | 2.5 | 1 | 3.300 | 240 |
| 3 | 95 | 2.5 | 2.5 | 2 | 3.259 | 235 |
| 4 | 95 | 2.5 | 2.5 | 2 | 3.300 | 242 |
| 5 | 95 | 2.5 | 2.5 | 3 | 3.245 | 187 |
| 6 | 95 | 2.5 | 2.5 | 3 | 3.152 | 190 |
| 1 | 95 | 1.0 | 4.0 | 1 | 3.273 | 245 |
| 2 | 95 | 1.0 | 4.0 | 1 | 3.200 | 229 |
| 3 | 95 | 1.0 | 4.0 | 2 | 3.197 | 218 |
| 4 | 95 | 1.0 | 4.0 | 2 | 3.186 | 233 |
| 5 | 95 | 1.0 | 4.0 | 3 | 3.262 | 193 |
| 6 | 95 | 1.0 | 4.0 | 3 | 3.215 | 182 |
| 1 | 95 | 0.0 | 5.0 | 1 | 3.252 | 251 |
| 2 | 95 | 0.0 | 5.0 | 1 | 3.149 | 218 |
| 3 | 95 | 0.0 | 5.0 | 2 | 3.245 | 261 |
| 4 | 95 | 0.0 | 5.0 | 2 | 3.249 | 259 |
| 5 | 95 | 0.0 | 5.0 | 3 | 3.257 | 191 |
| 6 | 95 | 0.0 | 5.0 | 3 | 3.231 | 180 |

Figure 3:
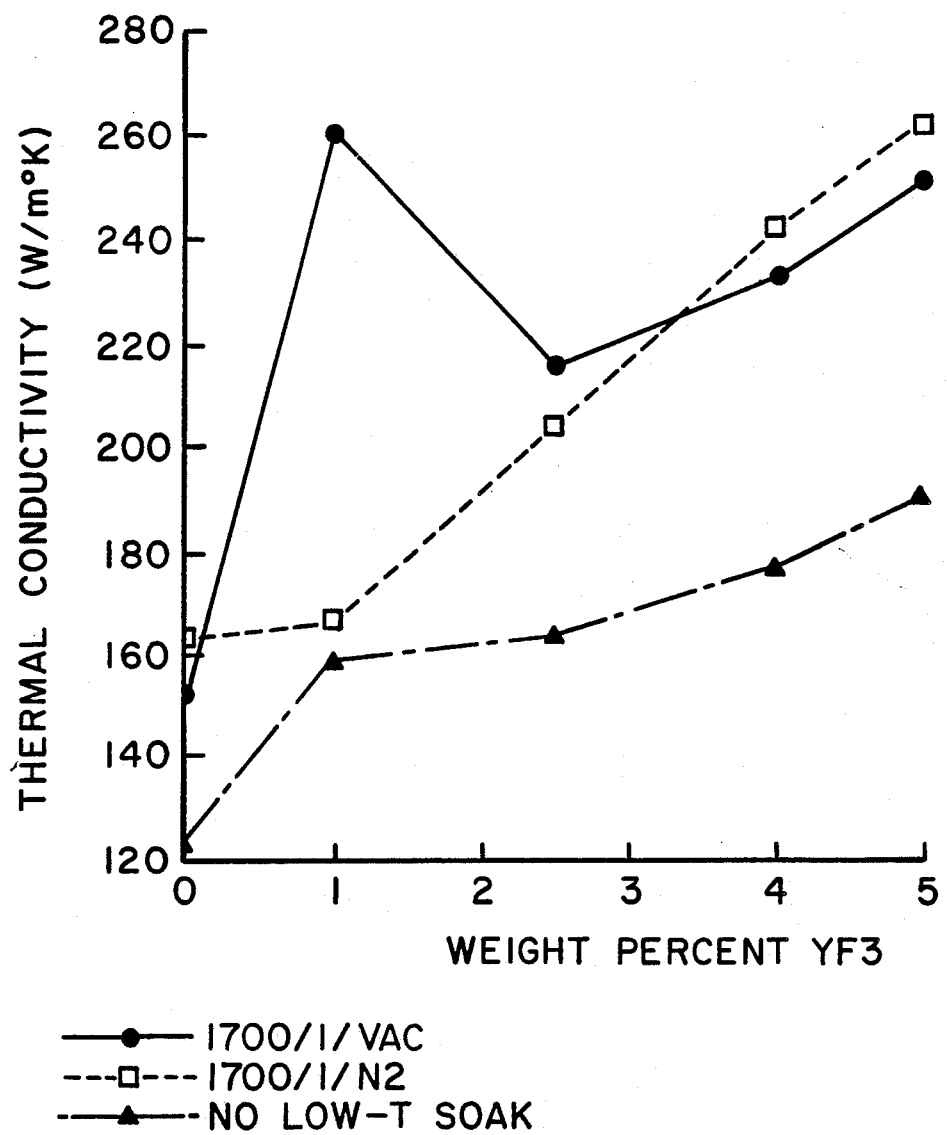
FIGS. 3, 4 and 5 are rectangular, graphical representations showing embodiments of the invention in terms of their pre-sintered compositions and their post-sintered thermal conductivities.
Figure 5:
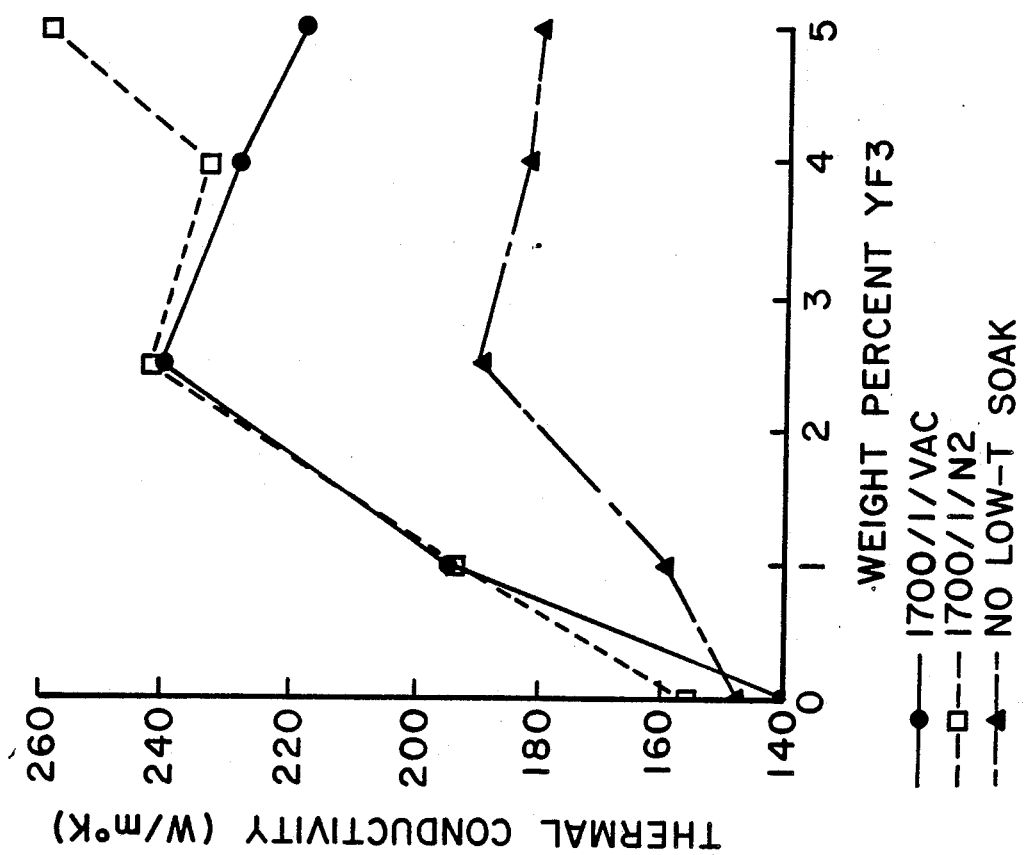
Figure 4:
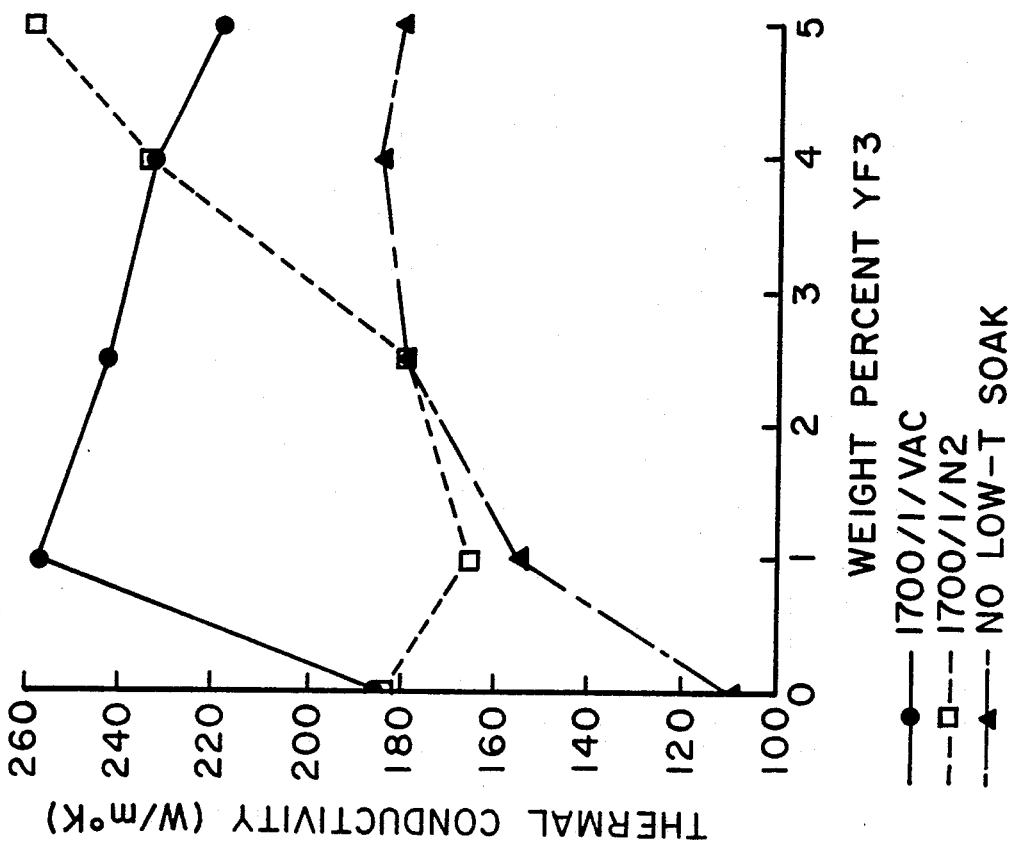

Some of the data set forth in TABLE 1 are also plotted in FIGS. 3-5 of the drawing. Thermal conductivity is plotted along the vertical axes, and X is plotted along the horizontal axes. "X" equals the percent YF$_3$, and 5-X equals the percent CaF$_2$ or SrF$_2$.

TABLE 2 sets forth, in similar manner, data for samples containing LaF$_3$ and/or CaF$_2$ as an additive. The AlN in each case is 100% minus the total percentage of LaF$_3$ and/or CaF$_2$ in a mixture of fluorides.

TABLE 2

| Sample No. | Wt % AlN | Wt % CaF2 | Wt % LaF3 | Run No. | D(g/cm³) | γ |
|---|---|---|---|---|---|---|
| 1 | 94 | 4.0 | 2.0 | 1 | 3.170 | 227 |
| 2 | 94 | 4.0 | 2.0 | 1 | 3.248 | 225 |
| 3 | 94 | 4.0 | 2.0 | 2 | 3.142 | 186 |
| 4 | 94 | 4.0 | 2.0 | 2 | 3.104 | 186 |
| 5 | 94 | 4.0 | 2.0 | 3 | 3.114 | 162 |
| 6 | 94 | 4.0 | 2.0 | 3 | 2.998 | 143 |
| 1 | 92.5 | 2.5 | 5.0 | 1 | 2.534 | 88 |
| 2 | 92.5 | 2.5 | 5.0 | 1 | 2.492 | 111 |
| 3 | 92.5 | 2.5 | 5.0 | 2 | 2.733 | 100 |
| 4 | 92.5 | 2.5 | 5.0 | 2 | 2.907 | 136 |
| 5 | 92.5 | 2.5 | 5.0 | 3 | 2.702 | 129 |
| 6 | 92.5 | 2.5 | 5.0 | 3 | 2.706 | 116 |

In addition to the enhancement effect on thermal conductivity already noted, it has been observed that sintered bodies, prepared in accordance with the present invention, may also exhibit strong resistance to mineral acid attack, in particular hydrochloric acid attack. This is of particular significance in applications which may involve plating solutions or other acid exposure.

TABLE 3 sets forth data for bodies prepared in accordance with the invention. In the TABLE, the weight percent amounts of CaF$_2$ and YF$_3$ included in original powder mixtures are shown under CaF$_2$ and YF$_3$; the time of firing at 1900° C. is shown under "T" in hours; weight loss in mg/cm$^2$ after immersion in 95° C. HCl (5%) for six hours under "WL"; and thermal conductivity in W/m°K under (γ). Each sample in TABLE 3 was held for 1 hour at 1700° C. under vacuum before soaking at 1900° C. in nitrogen.

TABLE 3

| CaF2 | YF3 | T | WL | γ |
|---|---|---|---|---|
| 0.00 | 5.00 | 16 | 0.6 | 178 |
| 5.00 | 0.00 | 16 | 4.8 | 175 |
| 4.75 | 0.25 | 16 | 0.6 | 213 |
| 4.50 | 0.50 | 16 | 0.4 | 217 |
| 4.75 | 0.25 | 8 | 1.0 | 213 |
| 4.90 | 0.10 | 8 | — | 200 |
| 5.00 | 0.00 | 8 | 5.7 | 180 |
| 0.00 | 5.00 | 8 | 3.8 | 163 |

By way of comparison, a 95% AlN+5% CaF$_2$ composition body was heated directly to 1900° C. and held for four hours. This body had no soak or hold period in the 1350°-1700° C. range. The measured weight loss, when exposed to 5% HCl at 95° C. for six hours was 25 mg/cm$^2$ Also, a sample of 100% AlN powder without a fluoride additive was heated directly to 1900° C. and held for 4 hours in nitrogen, without a soak in the 1350°-1700° C. range. This sample underwent a 2.2 mg/cm$^2$ weight loss in the HCl test. The thermal conductivity of this sample was 73 W/m°K.

I claim:

1. A method of sintering an aluminum nitride body which comprises firing the body in a non-oxidizing environment in accordance with a variable thermal cycle, the thermal cycle including heating to about 1300° C., raising the temperature from 1300° to 1750° C. in at least one hour, but not over five hours, further raising the temperature to 1800° C. in a non-oxidizing atmosphere, and maintaining the body in such atmosphere within the temperature range of 1800°-2000° C. for at least one hour but not over 24 hours, and cooling.

2. The method of claim 1 wherein the non-oxidizing environment is a nitrogen-containing atmosphere throughout the thermal cycle.

3. The method of claim 1 wherein the non-oxidizing environment is a vacuum during at least a portion of the time the body is within the temperature range below 1750° C.

4. The method of claim 3 wherein the body is maintained under vacuum during the entire time it is within the temperature range below 1750° C.

5. The method of claim 1 wherein the step of raising the temperature from 1300° to 1750° C. includes maintaining the body at a fixed temperature for at least one half hour.

6. The method of claim 5 wherein the fixed temperature is about 1700° C.

7. The method of claim 6 wherein the body is held at about 1700° C. for about one hour.

8. The method of claim 1 wherein the body is heated to a temperature of about 1900° C. and held at that temperature for at least one hour.

9. The method of claim 1 wherein the thermal cycle above 1750° C. is carried out in a nitrogen-containing atmosphere.

10. The method of claim 9 wherein the atmosphere is pure nitrogen.

11. A method in accordance with claim 1 wherein a refractory weight is placed upon the body and maintained there during the sintering cycle to maintain the body relatively flat.

12. A method in accordance with claim 11 wherein the weight is composed of a refractory nitride, carbide or boride.

13. A method in accordance with claim 11 wherein the weight is a refractory metal, metal oxide, or carbon having a facing of a refractory nitride, carbide, or boride.

14. A method in accordance with claim 1 wherein the aluminum nitride body is provided with a thin barrier layer facing both the lower and upper surfaces during the sintering cycle, the barrier layer being a refractory nitride, carbide or boride.

15. A method in accordance with claim 14 wherein the barrier layer is composed of boron nitride.

16. A method in accordance with claim 1 wherein the aluminum nitride body, in the green state, as a dopant at least one metal fluoride.

17. A method in accordance with claim 16 wherein the amount of metal fluoride dopant is 1-10 percent by weight.

18. A method in accordance with claim 17 wherein the amount of metal fluoride dopant is about five weight percent.

19. A method in accordance with claim 17 wherein the metal fluoride dopant is selected from the group consisting of yttrium fluoride alone,;a mixture of yttrium fluoride ($YF_3$) and an alkaline earth metal fluoride,($RF_2$) wherein the ratio of $YF_3$ to $RF_2$ is at least 1:50, and a mixture of a rare earth metal fluoride ($MF_3$), other than $YF_3$, with an alkaline earth metal fluoride wherein the ratio of $MF_3$ to $RF_2$ is not over 1:1.

20. A method in accordance with claim 19 wherein the selected metal fluoride dopant is yttrium fluoride alone or in combination with an alkaline earth metal fluoride.

21. A method in accordance with claim 20 wherein the metal fluoride dopant is yttrium fluoride alone.

22. A method in accordance with claim 20 wherein the green aluminum nitride body contains a mixture of yttrium fluoride and an alkaline earth metal fluoride in a ratio of at least 1:50.

23. A method in accordance with claim 22 wherein the alkaline earth metal fluoride is calcium fluoride 24. A method in accordance with claim 22 wherein the alkaline earth metal fluoride is strontium fluoride.

25. A method in accordance with claim 19 where the metal fluoride dopant is a mixture of a rare earth metal fluoride ($MF_3$) other than yttrium fluoride and an alkaline earth metal fluoride ($RF_2$) wherein the ratio of $MF_3$ to $RF_2$ is not over 1:1.

26. A method of fabricating a sintered aluminum nitride ceramic body which comprises,
 a. forming a compacted body from finely-divided aluminum nitride powder,
 b. firing the porous aluminum nitride body at a moderate temperature to remove any organic components,
 c. heating the body to about 1300° C. in a non-oxidizing environment,
 d. maintaining the body in such atmosphere within the temperature range of 1300°-1750° C. for about one to five hours,
 e. further heating the body to a sintering temperature in the range of 1800°-2000° C. in a non-oxidizing atmosphere,
 f. maintaining the body in that temperature range and atmosphere for at least an hour but not over 24 hours, and
 g. cooling.

27. A method according to claim 26 wherein the compacted aluminum nitride body is formed by dry pressing.

28. A method according to claim 26 wherein the aluminum nitride powder was mixed with a vehicle to form a castable paste and cast in desired form.

29. The method of claim 26 wherein the finely-divided aluminum nitride is mixed with up to 10% by weight of at least one metal fluoride additive.

30. A method according to claim 29 wherein metal fluoride additive is selected from the group consisting of yttrium fluoride alone, a mixture of yttrium fluoride ($YF_3$) and an alkaline earth metal fluoride ($RF_2$) wherein the ratio of $YF_3$ to $RF_2$ is at least 1:50, and a mixture of a rare earth metal fluoride ($MF_3$), other than $YF_3$, with an alkaline earth metal fluoride ($RF_2$) wherein the ratio of $MF_3$ to $RF_2$ is not over 1:1.

31. The method of claim 30 wherein the fluoride additive is yttrium fluoride alone or in combination with an alkaline earth metal fluoride 32. The method of claim 31 wherein the metal fluoride additive is a mixture of yttrium fluoride and an alkaline earth metal fluoride in a ratio of at least 1:50.

33. A method according to claim 31 wherein the metal fluoride additive is yttrium fluoride alone.

34. A method according to claim 30 wherein the metal fluoride additive is a mixture of a rare earth metal fluoride ($MF_3$), other than $YF_3$, with an alkaline earth metal fluoride ($RF_2$) wherein the ratio of $MF_3$ to $RF_2$ is not over 1:1.

35. The method of claim 30 wherein the alkaline earth metal fluoride is calcium fluoride.

36. The method of claim 30 wherein the alkaline earth metal fluoride is strontium fluoride.

37. The method of claim 26 wherein the aluminum nitride body is fired at about 550° C. to remove the organic vehicle.

38. The method of claim 26 wherein the non-oxidizing environment is a nitrogen-containing atmosphere throughout the thermal cycle.

39. The method of claim 26 wherein the non-oxidizing environment is a vacuum during at least a portion of the time the body is within the temperature range below 1750° C.

40. The method of claim 39 wherein the body is maintained under vacuum during the entire time it is within the temperature range below 1750° C.

41. The method of claim 26 wherein the step of raising the temperature from 1300° to 1750° C. includes maintaining the body at a fixed temperature for at least one half hour.

42. The method of claim 41 wherein the fixed temperature is about 1700° C.

43. The method of claim 42 wherein the body is held at about 1700° C. for about one hour.

44. The method of claim 26 wherein the body is heated to a temperature of about 1900° C. and held at that temperature for at least one hour.

45. The method of claim 26 wherein the thermal cycle above 1750° C. is carried out in a nitrogen-containing atmosphere.

46. The method of claim 45 wherein the atmosphere is pure nitrogen.

47. The method of claim 26 wherein the fired body is provided on its upper surface with a weight sufficient to maintain the body relatively flat during the sintering cycle.

48. The method of claim 47 wherein at least that portion of the weight in contact with the body is a refractory nitride, carbide or boride.

49. The method of claim 26 wherein the fired body is provided with a thin barrier layer facing both the lower and the upper surfaces during the sintering cycle, the barrier layer being a refractory nitride, carbide or boride.

50. The method of claim 49 wherein the barrier layer is composed of boron nitride.

51. A sintered aluminum nitride ceramic body having an oxygen content below 0.2% by weight whereby the body produced in accordance with claim 1, and has a thermal conductivity in excess of 170 w/m°K.

52. A sintered body in accordance with claim 51 wherein the thermal conductivity is in excess of 200 W/m°K.

53. An aluminum nitride body in accordance with claim 51 wherein the body has weight loss of not over about one mg/cm$^2$ when exposed to hot 5% HCl for six hours.

* * * * *